US010491972B2

(12) United States Patent
King et al.

(10) Patent No.: US 10,491,972 B2
(45) Date of Patent: Nov. 26, 2019

(54) POLE-MOUNTED VEHICLE SENSOR

(71) Applicant: IPS Group Inc., San Diego, CA (US)

(72) Inventors: David William King, Rancho Santa Fe, CA (US); Alexander Schwarz, San Diego, CA (US); Stephen John Hunter, Randpark Extension (ZA); Chad P. Randall, San Diego, CA (US)

(73) Assignee: IPS GROUP INC., San Diego, CA (US)

( * ) Notice: Subject to any disclaimer, the term of this patent is extended or adjusted under 35 U.S.C. 154(b) by 0 days.

(21) Appl. No.: 16/373,328

(22) Filed: Apr. 2, 2019

(65) Prior Publication Data

US 2019/0230421 A1 Jul. 25, 2019

Related U.S. Application Data

(63) Continuation of application No. 15/443,734, filed on Feb. 27, 2017, now Pat. No. 10,299,018.
(Continued)

(51) Int. Cl.
*H04Q 9/00* (2006.01)
*H04W 4/80* (2018.01)
(Continued)

(52) U.S. Cl.
CPC ........... *H04Q 9/00* (2013.01); *G06K 7/10415* (2013.01); *H02J 7/35* (2013.01); *H04B 5/0062* (2013.01); *H04W 4/80* (2018.02); *H04W 84/12* (2013.01)

(58) Field of Classification Search
CPC ......... H04Q 9/00; G06K 7/10415; H02J 7/35; H04B 5/0062; H04W 4/008; H04W 84/12
See application file for complete search history.

(56) References Cited

U.S. PATENT DOCUMENTS

D189,106 S 10/1960 Leiderman
3,183,411 A 5/1965 Palfi et al.
(Continued)

FOREIGN PATENT DOCUMENTS

CA 2377010 A1 10/2001
CA 2363915 A1 5/2003
(Continued)

OTHER PUBLICATIONS

Decision Denying Institution of Inter Partes Review dated Mar. 30, 2016 of U.S. Pat. No. 7,854,310. IPR Case No. IPR2016-00068.
(Continued)

*Primary Examiner* — James J Yang
(74) *Attorney, Agent, or Firm* — Wilson Sonsini Goodrich & Rosati

(57) ABSTRACT

Devices and meters comprising: a housing configured to mount to a pole supporting an existing meter, the housing defining an interior; a sensor within the interior of the housing, the sensor configured to collect environmental information pertaining to the local external environment of the existing meter; a wireless radio within the interior of the housing, the wireless radio configured to transmit the environmental information to the existing meter or to a remote server in communication with the existing meter; a power unit within the interior of the housing, the power unit supplying power to the sensor and the wireless radio.

20 Claims, 10 Drawing Sheets

Related U.S. Application Data

(60) Provisional application No. 62/301,302, filed on Feb. 29, 2016.

(51) Int. Cl.

| | | |
|---|---|---|
| *G06K 7/10* | (2006.01) | |
| *H04B 5/00* | (2006.01) | |
| *H02J 7/35* | (2006.01) | |
| *H04W 84/12* | (2009.01) | |

(56) References Cited

U.S. PATENT DOCUMENTS

| | | |
|---|---|---|
| 3,535,870 A | 10/1970 | Mitchell et al. |
| 3,999,372 A | 12/1976 | Welch et al. |
| 4,043,117 A | 8/1977 | Maresca et al. |
| 4,310,890 A | 1/1982 | Trehn et al. |
| 4,460,965 A | 7/1984 | Trehn et al. |
| 4,880,097 A | 11/1989 | Speas |
| 5,201,396 A | 4/1993 | Chalabian et al. |
| 5,222,076 A | 6/1993 | Ng et al. |
| 5,244,070 A | 9/1993 | Carmen et al. |
| 5,273,151 A | 12/1993 | Carmen et al. |
| 5,426,363 A | 6/1995 | Akagi et al. |
| 5,442,348 A | 8/1995 | Mushell et al. |
| 5,471,139 A | 11/1995 | Zadoff et al. |
| 5,614,892 A | 3/1997 | Ward, II et al. |
| 5,640,002 A | 6/1997 | Ruppert et al. |
| 5,642,119 A | 6/1997 | Jacobs et al. |
| 5,659,306 A | 8/1997 | Bahar |
| 5,710,743 A | 1/1998 | Dee et al. |
| 5,777,951 A | 7/1998 | Mitschele et al. |
| 5,806,651 A | 9/1998 | Carmen et al. |
| D400,115 S | 10/1998 | Yaron et al. |
| 5,842,411 A | 12/1998 | Johnson |
| 5,845,268 A | 12/1998 | Moore et al. |
| 5,852,411 A | 12/1998 | Jacobs et al. |
| 6,078,272 A | 6/2000 | Jacobs et al. |
| 6,081,205 A | 6/2000 | Williams et al. |
| 6,111,522 A | 8/2000 | Hiltz et al. |
| 6,195,015 B1 | 2/2001 | Jacobs et al. |
| D439,591 S | 3/2001 | Reidt et al. |
| 6,229,455 B1 | 5/2001 | Yost et al. |
| D447,714 S | 9/2001 | Cappiello |
| D449,010 S | 10/2001 | Petrucelli |
| 6,312,152 B2 | 11/2001 | Dee et al. |
| RE37,531 E | 1/2002 | Chaco et al. |
| D454,807 S | 3/2002 | Cappiello |
| D461,728 S | 8/2002 | Tuxen et al. |
| D463,749 S | 10/2002 | Petrucelli |
| 6,505,774 B1 | 1/2003 | Fulcher et al. |
| 6,559,776 B2 | 5/2003 | Katz et al. |
| 6,697,730 B2 | 2/2004 | Dickerson |
| 6,812,857 B1 | 11/2004 | Kassab et al. |
| 6,856,922 B1 | 2/2005 | Austin et al. |
| 6,885,311 B2 | 4/2005 | Howard et al. |
| 6,946,974 B1 | 9/2005 | Racunas, Jr. |
| 7,023,360 B2 | 4/2006 | Staniszewski et al. |
| 7,029,167 B1 | 4/2006 | Mitschele |
| 7,391,339 B2 | 6/2008 | Howard et al. |
| D575,168 S | 8/2008 | King et al. |
| D587,141 S | 2/2009 | King et al. |
| 7,783,530 B2 | 8/2010 | Slemmer et al. |
| 7,825,826 B2 | 11/2010 | Welch et al. |
| 7,854,310 B2 | 12/2010 | King et al. |
| 7,855,661 B2 | 12/2010 | Ponert |
| D654,816 S | 2/2012 | MacKay et al. |
| D656,046 S | 3/2012 | MacKay et al. |
| 8,138,950 B1 | 3/2012 | Leung |
| D661,603 S | 6/2012 | MacKay et al. |
| 8,279,107 B2 | 10/2012 | Krstanovic et al. |
| 8,395,532 B2 | 3/2013 | Chauvin et al. |
| D692,784 S | 11/2013 | Anderssen et al. |
| 8,590,687 B2 | 11/2013 | King et al. |
| 8,595,054 B2 | 11/2013 | King et al. |
| 8,631,921 B2 | 1/2014 | Jones et al. |
| 8,684,158 B2 | 4/2014 | Jones et al. |
| D705,090 S | 5/2014 | MacKay et al. |
| D707,140 S | 6/2014 | King et al. |
| D707,141 S | 6/2014 | King et al. |
| D707,142 S | 6/2014 | King et al. |
| 8,749,403 B2 | 6/2014 | King et al. |
| 8,770,371 B2 | 7/2014 | MacKay et al. |
| 8,862,494 B2 | 10/2014 | King et al. |
| 8,884,785 B2 | 11/2014 | Groft et al. |
| 9,127,964 B2 | 9/2015 | Schwarz et al. |
| D749,000 S | 2/2016 | King et al. |
| D750,513 S | 3/2016 | King et al. |
| D756,807 S | 5/2016 | King et al. |
| D756,808 S | 5/2016 | King et al. |
| 9,424,691 B2 | 8/2016 | King et al. |
| 9,489,776 B2 | 11/2016 | Kell et al. |
| 9,508,198 B1 | 11/2016 | King et al. |
| 9,661,403 B2 | 5/2017 | King et al. |
| 9,728,085 B2 | 8/2017 | Schwarz et al. |
| 9,805,518 B2 | 10/2017 | King et al. |
| 10,262,345 B2 | 4/2019 | King et al. |
| 10,297,150 B2 | 5/2019 | Schwarz et al. |
| 10,299,018 B1 | 5/2019 | King et al. |
| 2002/0008639 A1 | 1/2002 | Dee |
| 2002/0111768 A1 | 8/2002 | Ghorayeb et al. |
| 2003/0128136 A1 | 7/2003 | Spier et al. |
| 2003/0132840 A1 | 7/2003 | Bahar |
| 2003/0169183 A1 | 9/2003 | Korepanov et al. |
| 2003/0179107 A1 | 9/2003 | Kibria et al. |
| 2003/0222792 A1* | 12/2003 | Berman ............... G07B 15/02 340/932.2 |
| 2004/0254840 A1 | 12/2004 | Slemmer et al. |
| 2005/0099320 A1 | 5/2005 | Nath et al. |
| 2005/0226201 A1 | 10/2005 | McMillin et al. |
| 2006/0136131 A1 | 6/2006 | Dugan et al. |
| 2006/0267799 A1 | 11/2006 | Mendelson |
| 2007/0016539 A1 | 1/2007 | Groft et al. |
| 2007/0040449 A1 | 2/2007 | Spurlin et al. |
| 2007/0074702 A1 | 4/2007 | Nakamura et al. |
| 2007/0184852 A1 | 8/2007 | Johnson et al. |
| 2007/0189907 A1 | 8/2007 | Kunihiro et al. |
| 2007/0210935 A1 | 9/2007 | Yost et al. |
| 2007/0285281 A1 | 12/2007 | Welch et al. |
| 2008/0052254 A1 | 2/2008 | Al Amri et al. |
| 2008/0071611 A1 | 3/2008 | Lovett |
| 2008/0147268 A1 | 6/2008 | Fuller |
| 2008/0238715 A1 | 10/2008 | Cheng et al. |
| 2009/0109062 A1 | 4/2009 | An |
| 2009/0159674 A1 | 6/2009 | King et al. |
| 2009/0183966 A1 | 7/2009 | King et al. |
| 2010/0188932 A1 | 7/2010 | Hanks et al. |
| 2010/0332394 A1 | 12/2010 | Ioli |
| 2011/0057815 A1 | 3/2011 | King et al. |
| 2011/0060653 A1 | 3/2011 | King et al. |
| 2011/0063133 A1 | 3/2011 | Keller et al. |
| 2011/0313822 A1 | 12/2011 | Burdick et al. |
| 2011/0320243 A1 | 12/2011 | Khan et al. |
| 2012/0084210 A1 | 4/2012 | Farahmand |
| 2012/0158466 A1 | 6/2012 | John |
| 2012/0222935 A1 | 9/2012 | MacKay et al. |
| 2012/0285790 A1* | 11/2012 | Jones ..................... G07B 15/02 194/217 |
| 2012/0285791 A1 | 11/2012 | Jones et al. |
| 2012/0285792 A1 | 11/2012 | Jones et al. |
| 2012/0285793 A1 | 11/2012 | Jones et al. |
| 2012/0286036 A1 | 11/2012 | Jones et al. |
| 2013/0027218 A1 | 1/2013 | Schwarz et al. |
| 2013/0099943 A1* | 4/2013 | Subramanya ......... G01S 7/2926 340/933 |
| 2013/0116952 A1 | 5/2013 | Chai |
| 2014/0108107 A1 | 4/2014 | Jones et al. |
| 2014/0129158 A1 | 5/2014 | Shea |
| 2014/0210646 A1 | 7/2014 | Subramanya |
| 2014/0214499 A1 | 7/2014 | Hudson et al. |
| 2014/0214500 A1 | 7/2014 | Hudson et al. |
| 2014/0229246 A1 | 8/2014 | Ghaffari |

(56) References Cited

U.S. PATENT DOCUMENTS

| | | |
|---|---|---|
| 2015/0106172 A1 | 4/2015 | Salama |
| 2017/0098339 A1 | 4/2017 | Keller et al. |
| 2018/0025549 A1 | 1/2018 | King et al. |

FOREIGN PATENT DOCUMENTS

| | | |
|---|---|---|
| EP | 0329129 A2 | 8/1989 |
| EP | 1128350 B1 | 10/2007 |
| IL | 149880 A | 6/2007 |
| JP | S5259000 A | 5/1977 |
| JP | S58121494 A | 7/1983 |
| WO | WO-2009154787 A2 | 12/2009 |
| WO | WO-2014014494 A1 | 1/2014 |

OTHER PUBLICATIONS

Decision Denying Inter Partes Review dated Apr. 1, 2016 of U.S. Pat. No. 8,595,054. IPR Case No. IPR2016-00069.
Decision Denying Inter Partes Review dated Apr. 1, 2016 of U.S. Pat. No. 8,595,054. IPR Case No. IPR2016-00070.
Decision Instituting Inter Partes Review dated Mar. 30, 2016 of U.S. Pat. No. 7,854,310. IPR Case No. IPR2016-00067.
Final Written Decision of U.S. Pat. No. 7,854,310. IPR Case No. IPR2016-00067 dated Mar. 27, 2017.
Flatley. In San Francisco, Hackers Park for Free. Read filed under Misc. Gadgets, downloaded from www.engadget.com website on May 3, 2010. Orriginally posted on Jul. 31, 2009 (5 pgs.).
Howland. How M2M Maximizes Denver's Revenue. Field TechnologiesOnline.com, Oct. 2011, pp. 9-12 [online] [retrieved Mar. 5, 2013], Retrieved from http://www.fieldtechnologiesonline.com/doc.mvc/How-M2M-Maximizes-Denvers-Revenue-0001 (4 pgs).
Meter Solutions, Single-Space Meters brochure, downloaded from www.duncansolutions.com website. (revised Apr. 2006) (2 pgs.).
PCT/US2010/047907 International Preliminary Report on Patentability dated Mar. 15, 2012.
PCT/US2010/047907 International Search Report dated Apr. 26, 2011.
PCT/US2012/048190 International Search Report dated Jan. 22, 2013.
Petition for Inter Partes Review of U.S. Pat. No. 7,854,310. IPR Case No. IPR2016-00067, filed Oct. 22, 2015.
Petition for Inter Partes Review of U.S. Pat. No. 7,854,310. IPR Case No. IPR2016-00068, filed Oct. 22, 2015.
Petition for Inter Partes Review of U.S. Pat. No. 8,595,054. IPR Case No. IPR2016-00069, filed Oct. 22, 2015.
Petition for Inter Partes Review of U.S. Pat. No. 8,595,054. IPR Case No. IPR2016-00070, filed Oct. 22, 2015.
Tung. Design of an advanced on-street parking meter. RIT Scholar Works. Thesis/Dissertation Collections (75 pgs.) (2001).

* cited by examiner

POLE-MOUNTED VEHICLE SENSOR

CROSS-REFERENCE TO RELATED APPLICATIONS

This application is a continuation of U.S. application Ser. No. 15/443,734, filed Feb. 27, 2017, which claims the benefit of U.S. Provisional Application No. 62/301,302, filed Feb. 29, 2016, the entire contents of each of which are hereby incorporated by reference in their entireties.

BACKGROUND OF THE INVENTION

Sensors collecting environmental information and wireless communication capabilities improve the functionality of street parking meters. Parking meters including such technologies are able to offer higher levels of service to both consumers and municipalities. Parking meters with sensors collecting environmental information and wireless communication capabilities also offer enhanced ability to accommodate refined schemes of rates and time limits. Current practices adopted for replacing existing parking meters with technologically advanced upgraded versions involve labor intensive and expensive steps, such as coring of the asphalt surface of a street or sidewalk, replacement of all the internal components of an existing meter, or complete removal of an existing meter and installation of a new meter.

SUMMARY OF THE INVENTION

The present invention provides a fast and convenient upgrade procedure to add environmental information collecting capability to an existing parking meter by requiring only the simple step of installing a new device, which comprises a sensor, onto an existing meter. In some embodiments, the housing of the device described herein is mounted to a pole supporting an existing meter, the housing defining an interior. In other embodiments, the housing of the device encloses a sensor, a wireless radio and a power unit. In further embodiments, the sensor collects environmental information pertaining to the local external environment of the existing meter. In some embodiments, the device described herein contains a wireless radio which transmits the environmental information collected by the sensor to the existing meter. In other embodiments, the wireless radio transmits the environmental information collected by the sensor to a remote server in communication with the existing meter. In some embodiments, the devices described herein are self-contained, having an independent power source and communications element. In further embodiments, the devices described herein do not require an electrical connection to an existing meter. For example, in some embodiments, the device is physically associated with an existing meter and optionally in wireless communication with the existing parking meter mechanism, but does not require a functional, wired, electrical connection to any component of the existing meter. This feature facilitates rapid, low-cost upgrades, reduces operating and maintenance costs, and results in a more modular system that is easier to upgrade further in the future.

The devices described herein are compatible with, and can be retrofitted to, a wide range of existing meters. Further, the devices are designed such that the internal components, e.g., sensor, wireless radio transmitter, RF tag reader, solar cell battery, etc. are not visible at all from the outside, thereby protecting the parking meter against possible acts of vandalism. Parking meters fitted with the devices described herein can be serviced easily.

In some embodiments, the existing meter is a parking meter. In other embodiments, the sensor is a vehicle sensor. In some embodiments, the parking meter is a single space parking meter. In other embodiments, the parking meter is a multi-space parking meter.

In some embodiments, the environmental information comprises the presence and/or movement of a vehicle in a parking space associated with the existing meter. In other embodiments, the device comprises a housing. In further embodiments, the device comprises components needed to wirelessly engage with a unique RF tag that is affixed to the existing meter. In such embodiments, the device optionally obtains a unique location-specific identifier from the RF tag and transmits the identifier to a remote server where configuration information pertaining to local environments is collected and stored. In this way, the devices described herein provide a streamlined upgrade process whereby the housing of the device is mounted to a pole supporting an existing meter. The device obtains the associated identifier, and uses the identifier to request its intended configuration information and operating parameters from a remote server. In various embodiments, the remote server is a remote database hosted on a cloud system. In further embodiments, the device optionally obtains a unique location-specific identifier from the RF tag directly as a means to identify its location.

In one aspect, disclosed herein are devices comprising: a housing configured to mount to a pole supporting an existing meter, the housing defining an interior; a sensor within the interior of the housing, the sensor configured to collect environmental information pertaining to the local external environment of the existing meter; a wireless radio within the interior of the housing, the wireless radio configured to transmit the environmental information to the existing meter or to a remote server in communication with the existing meter; and a power unit within the interior of the housing, the power unit supplying power to the sensor and the wireless radio. In some embodiments, the existing meter is a parking meter and the sensor is a vehicle sensor. In further embodiments, the parking meter is a single space parking meter or a multi-space parking meter. In some embodiments, the environmental information comprises the presence and/or movement of a vehicle in a parking space associated with the existing meter. In some embodiments, the sensor utilizes radar, infrared light or ultrasonic waves. In a particular embodiment, the sensor is a radar. In further embodiments, the housing of the device comprises a material that is at least partially radar transparent. In various embodiments, the housing of the device comprises material that allows sunlight to pass through to a solar panel. In still further embodiments, the housing of the device comprises polycarbonate, ABS, or a combination thereof. In some embodiments, the sensor is mounted on a gimbal to facilitate positioning the sensor. In some embodiments, the radio is a wireless radio utilizes ISM-band, Wi-Fi, Bluetooth, or Zig-Bee. In some embodiments, the device further comprises an RF reader located within the interior of the housing of the device and configured to receive a meter identification, a meter location, or a combination thereof, from a wireless tag associated with the existing meter. In other embodiments, the device comprises an RF reader within the interior of the housing of the device and is configured to receive a meter identification, a meter location, or a combination thereof, through a wired connection to the meter. In further embodiments, the wireless radio is further configured to transmit the meter identification in association with the environmental information. In some embodiments, the device is operationally self-sufficient, the sensor, the wireless radio, and the power unit being not electrically connected to the existing meter. In some embodiments, the device comprises a plurality of sensors within the interior of the housing. In further embodiments, at least one senor is a camera. In some embodiments, the power unit comprises at least one rechargeable battery. In further embodiments, the device comprises at least one solar cell to recharge the at least one rechargeable battery.

In another aspect, disclosed herein are meters comprising: a pole; a meter device supported by the pole; a device comprising a housing defining an interior, the device configured to mount to the pole; a sensor within the interior of the housing, the sensor configured to collect environmental information pertaining to the local external environment of the meter; a wireless radio within the interior of the housing, the wireless radio configured to transmit the environmental information to the meter device or to a remote server in communication with the meter device; and a power unit within the interior of the housing, the power unit supplying power to the sensor and the wireless radio. In some embodiments, the meter is a parking meter and the sensor is a vehicle sensor. In other embodiments, the environmental information comprises the presence and/or movement of a vehicle in a parking space associated with the meter. In some embodiments, parking meter is a single space parking meter. In other embodiments, parking meter is a multi-space parking meter. In some embodiment, the sensor is a radar. In further embodiments, the housing of the device comprises a material that is at least partially radar transparent. In still further embodiments, the housing of the device comprises polycarbonate, ABS, or a combination thereof. In even further embodiments, the housing of the device comprises paint or shielding to further optimize RF signal detection, transmission, and reception. In some embodiments, the sensor is mounted on a gimbal to facilitate positioning the sensor. In some embodiments, the radio is a wireless radio utilizes ISM-band, Wi-Fi, Bluetooth, or ZigBee. In some embodiments, the device further comprises an RF reader within the housing of the device and configured to receive a meter identification, a meter location, or a combination thereof, from a wireless tag associated with the meter device. In further embodiments, the wireless radio is further configured to transmit the meter identification in association with the environmental information. In some embodiments, the device is operationally self-sufficient, the sensor, the wireless radio, and the power unit being not electrically connected to the meter device. In various embodiments, the operationally self-sufficient device is able to wirelessly communicate with a remote server independent of the meter device. In some embodiments, the device comprises a plurality of sensors within the interior of the housing. In further embodiments, at least one senor is a camera. In some embodiments, the power unit comprises at least one rechargeable batter. In further embodiments, the device comprises at least one solar cell to recharge the at least one rechargeable battery. In even further embodiments, the wireless radio transmitter can be used to communicate directly to a database, a user, an enforcement officer, or a maintenance technician. For example, the wireless radio can communicate information to a handheld device, e.g., a cellular device or its equivalent, to transmit various types of enforcement data (e.g., meter identification, meter location, vehicle identification, license plate information, vehicle registration information, citation history, data indicating issuance of a citation, data related to the type of citation issued, etc.) to parking enforcement personnel.

In another aspect, disclosed herein are methods of upgrading a meter comprising: affixing a device to a pole supporting an existing meter; provided that the device comprises: a housing defining an interior; a sensor within the interior of the housing, the sensor configured to collect environmental information pertaining to the local external environment of the exiting meter; a wireless radio within the interior of the housing, the wireless radio configured to transmit the environmental information to the exiting meter or to a remote server in communication with the exiting meter; an RF reader within the interior of the housing, the RF reader configured to receive a meter identification from a wireless tag associated with the existing meter, the wireless radio further configured to transmit the meter identification in association with the environmental information; and a power unit within the interior of the housing, the power unit supplying power to the sensor, the wireless radio, and the RF reader; whereby the meter is upgraded. In some embodiments, the existing meter is not altered or replaced. In other embodiments, the existing meter is a parking meter, the sensor is a vehicle sensor, and the environmental information comprises the presence and/or movement of a vehicle in a parking space associated with the existing meter. In further embodiments, the sensor is a radar.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
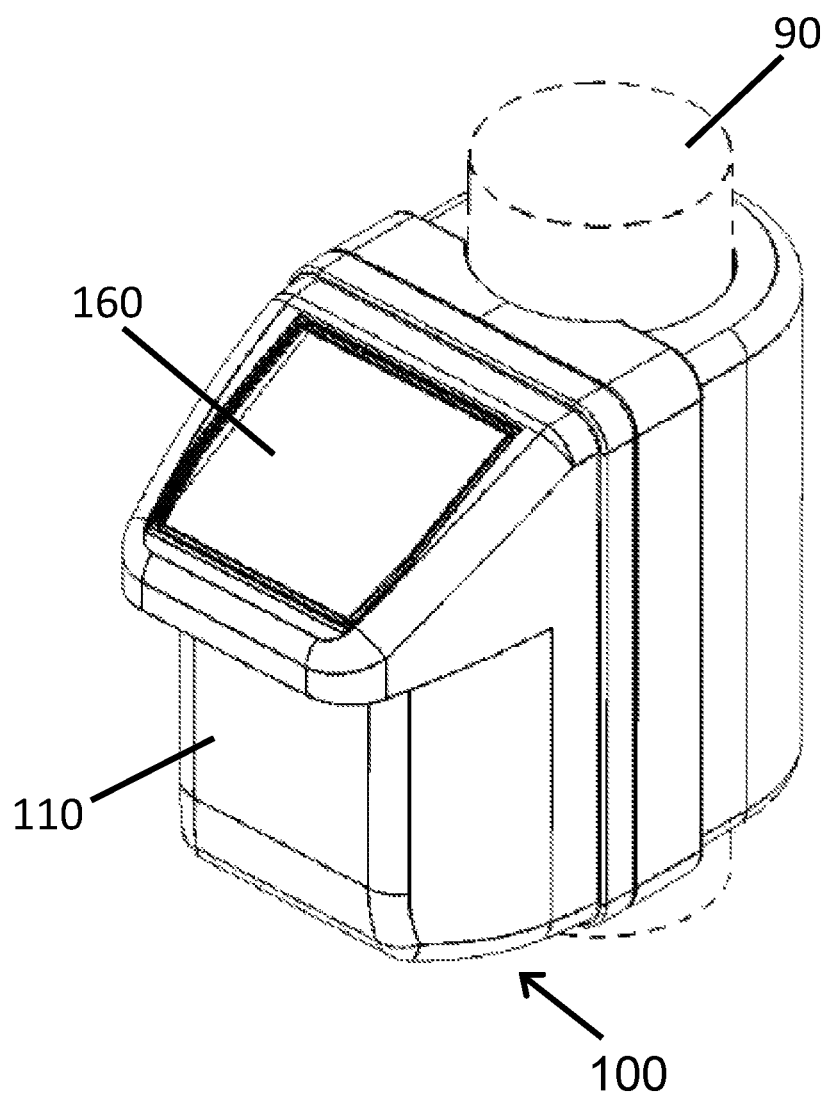
FIG. 1 shows a non-limiting example of a device described herein; in this case, a top front perspective view of an exemplary device mounted on a pole.

Traditional street parking meters are in the process of being phased out and replaced by meters that are enabled to accept modern methods of payments, e.g., credit cards, debit cards, smart cards, pay-by-phone, etc. Replacement and installation of an entirely new unit is costly for cities, municipalities, or other authorities in charge of street parking meters, thereby causing eventual increase in parking rates to recover the cost of purchase and installation. Moreover, replacement and installation of an entirely new unit creates electronic waste. The device described in the present invention, offers a cost effective and environmentally-friendly solution to the problem. The housing of the device of the present invention can be easily fitted to mount to the poles supporting existing street parking meters, even those parking meters that have previously been upgraded by replacing the internal meter mechanism. In contrast, installations of sensors in existing street meters typically involve excessive road work, drilling, and infrastructure modifications on street lights, utility poles, and underground wiring. The addition of the device described herein to existing parking meters by mounting the housing of the device to the poles of existing parking meters reduces waste, is easier to install, and is less expensive to maintain.

In certain embodiments, the device of the present invention is completely solar powered. Street parking meters that are upgraded using a solar powered device described herein do not need batteries to operate. This feature reduces the potential hike in operating cost of the street parking meters that are upgraded with the device described herein. In other embodiments, the sensor within the interior of the housing of the device is completely battery powered, completely wire powered, and/or optionally solar powered.

In certain embodiments, the housing of the device of the present invention defines an interior. The interior of the housing is equipped with one or more sensors configured to collect environmental information pertaining to the local external environment of the existing parking meter, and a wireless radio transmitter configured to transmit the collected environmental information either to the existing parking meter or to a remote server in communication with the existing parking meter. In certain embodiments, a sensor detects vehicles within the local environment of the parking meter on which the housing is mounted. In certain embodiments, a wireless radio transmitter communicates, directly or indirectly, with a remote management or maintenance server. In certain embodiments, the interior of the housing is also equipped with an RF tag reader. The RF tag reader can be used to read a wireless RF tag located on the base of an existing parking meter, and acquire information regarding the local environment. Information about the local environment can then be communicated, via a wireless radio transmitter, also housed within the housing, to a remote management or maintenance server. This allows immediate communication between the upgraded parking meter and the remote maintenance or management server. In this way, the housing of the device containing the sensor, RF tag reader, and wireless radio transmitter can communicate with a remote management or maintenance server and configure itself directly, independent of the device.

Described herein, in certain embodiments, are devices comprising: a device configured to mount to a pole supporting an existing meter, the housing of the device engageable with the pole of the existing meter defining an interior; a sensor within the interior of the housing, the sensor configured to collect environmental information pertaining to the local external environment of the existing meter; a wireless radio within the interior of the housing, the wireless radio configured to transmit the environmental information to the existing meter or to a remote server in communication with the existing meter; and a power unit within the interior of the housing, the power unit supplying power to the sensor and the wireless radio.

Also described herein, in certain embodiments, are meters comprising: a pole; a meter device supported by the pole; a device comprising a housing defining an interior, the device configured to mount to the pole; a sensor within the interior of the housing, the sensor configured to collect environmental information pertaining to the local external environment of the meter; a wireless radio within the interior of the housing, the wireless radio configured to transmit the environmental information to the meter device or to a remote server in communication with the meter device; and a power unit within the interior of the housing, the power unit supplying power to the sensor and the wireless radio.

Also described herein, in certain embodiments, are methods of upgrading a meter comprising: affixing a device to a pole supporting an existing meter; provided that the device comprises: a housing defining an interior; a sensor within the interior of the housing, the sensor configured to collect environmental information pertaining to the local external environment of the exiting meter; a wireless radio within the interior of the housing, the wireless radio configured to transmit the environmental information to the exiting meter or to a remote server in communication with the exiting meter; an RF reader within the interior of the housing, the RF reader configured to receive a meter identification from a wireless tag associated with the existing meter, the wireless radio further configured to transmit the meter identification in association with the environmental information; and a power unit within the interior of the housing, the power unit supplying power to the sensor, the wireless radio, and the RF reader; whereby the meter is upgraded.

The components of the device and methods for carrying out meter upgrade using the device are described in detail in the subsequent sections.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Device Housing

In certain embodiments, existing parking meters are fitted with a device 100 of the present invention. The housing 110 of the device 100 is configured to mount to a pole 90 of an existing meter. The housing 110 of the device 100 comprises a screen 160. The screen 160 may be a display screen or a solar panel. If the device 100 comprises both a display screen and a solar panel, two screens 160 are allowed on the housing 110. The location of the screen 160 can be determined based on the use of the screen 160. The device 100 further comprises a sensor 130, a wireless radio 140 and a power unit 150, all of which are enclosed in the interior of the housing 110. The sensor 130 may be stationary or may change its orientation or direction within the interior of the housing 110.

In some embodiments, the housing of the device is at least partially made of a strong material that is resistant to theft, weather, and vandalism. Examples of materials suitable for housings include various metals, such as stainless steel, and the like. In further embodiments, the housing of the device is at least partially made of a material that is at least partially transparent to radar, ultrasonic, infrared, or microwaves. Examples of transparent materials for housings include polycarbonate, ABS, or combinations thereof.

Referring to FIG. 1, in a particular embodiment, a device 100 of the present invention, shown in a perspective view, comprises a housing 110 which is configured to mount to a pole 90 supporting an existing meter. It should be noted that the pole 90 is shown in FIG. 1 as dotted lines to indicate that the pole 90, in some embodiments, is not part of the device 100 of the present invention. The interior of the housing 110 optionally houses components comprising environmental sensors, batteries, RFID tag readers, wireless radio transmitters, or a combination thereof. The housing 110 optionally has a solar panel. The housing 110 further comprises a screen 160. In one embodiment, the screen 160 is a display screen. In another embodiment, the screen 160 is a solar panel. The housing 110 may comprise more than one screen 160.

Figure 2:
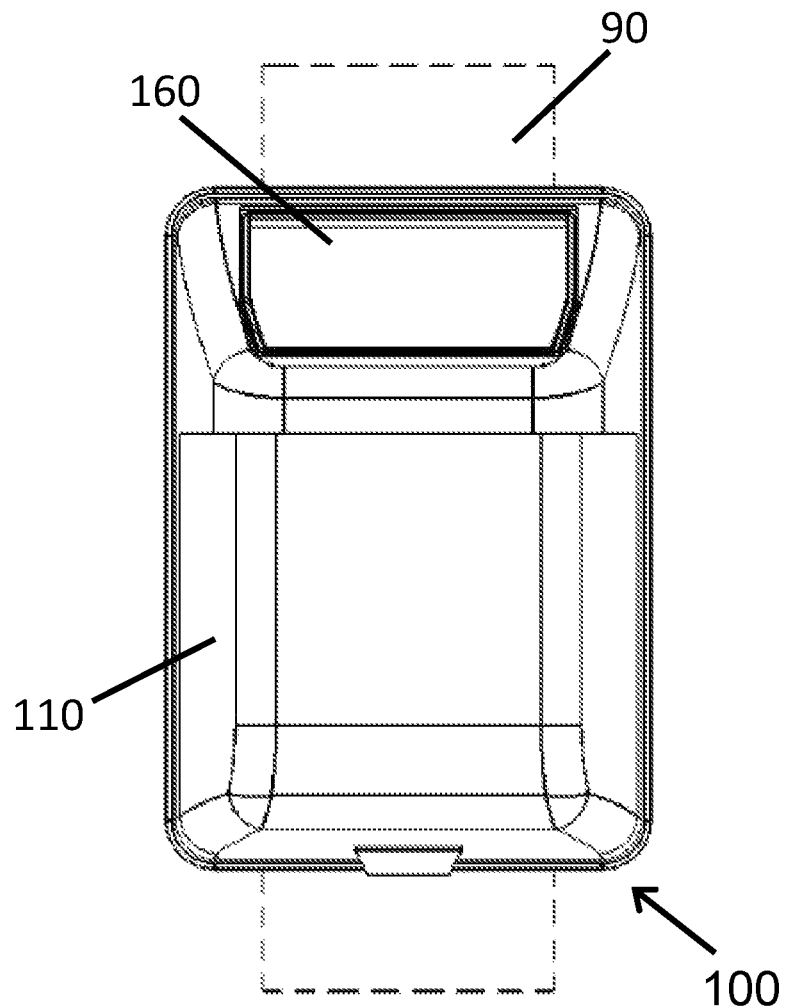
FIG. 2 shows a non-limiting example of a device described herein; in this case, a front view of an exemplary device mounted on a pole.

Turning now to FIG. 2, in another embodiment, a device 100 of the present invention, shown in a front view, comprises a housing 110 which is configured to mount to a pole 90 supporting an existing meter. The interior of the housing 110 optionally houses components comprising environmental sensors, batteries, RFID tag readers, wireless radio transmitters, or a combination thereof. The housing 110 optionally has a solar panel. The housing 110 further comprises a screen 160. In one embodiment, the screen 160 is a display screen. In another embodiment, the screen 160 is a solar panel. In still another embodiment, the screen 160 is a touchscreen to allow input of information by the user.

Figure 3:
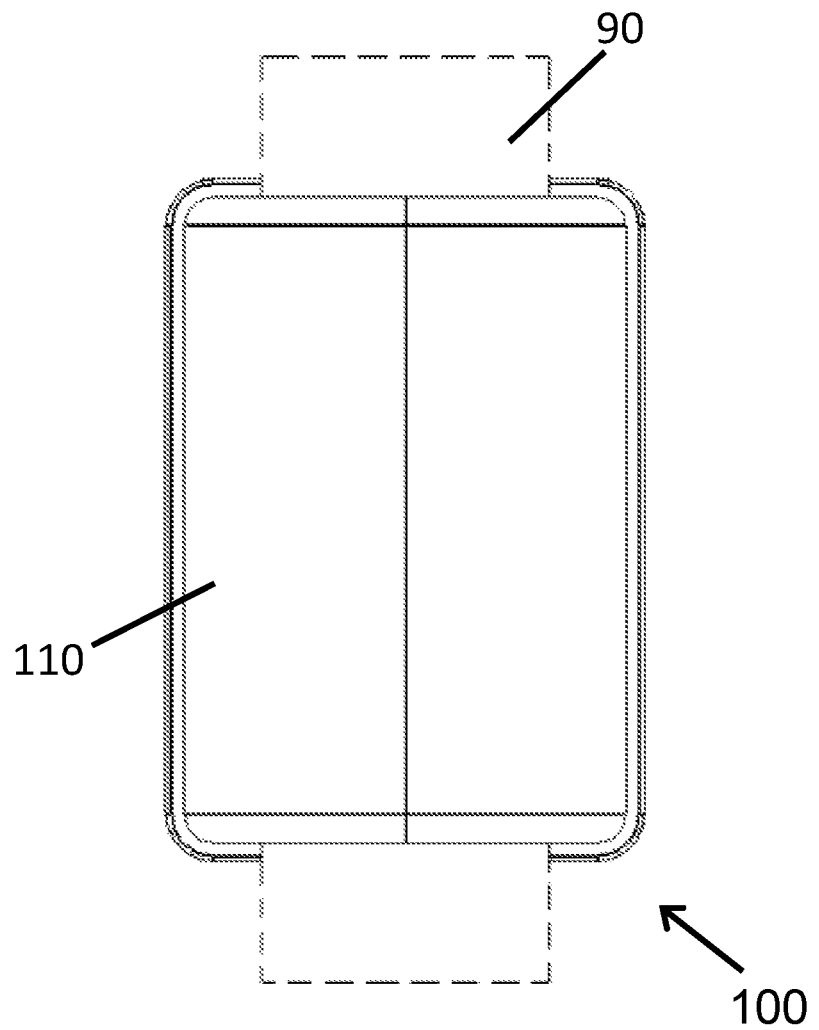
FIG. 3 shows a non-limiting example of a device described herein; in this case, a rear view of an exemplary device mounted on a pole.

Referring now to FIG. 3, in a particular embodiment, a device 100 of the present invention, shown in a back view, comprises a housing 110 which is configured to mount to a pole 90 supporting an existing meter. The interior of the housing 110 optionally houses components comprising environmental sensors, batteries, RFID tag readers, wireless radio transmitters, or a combination thereof. The housing 110 optionally has a solar panel.

Figure 4:
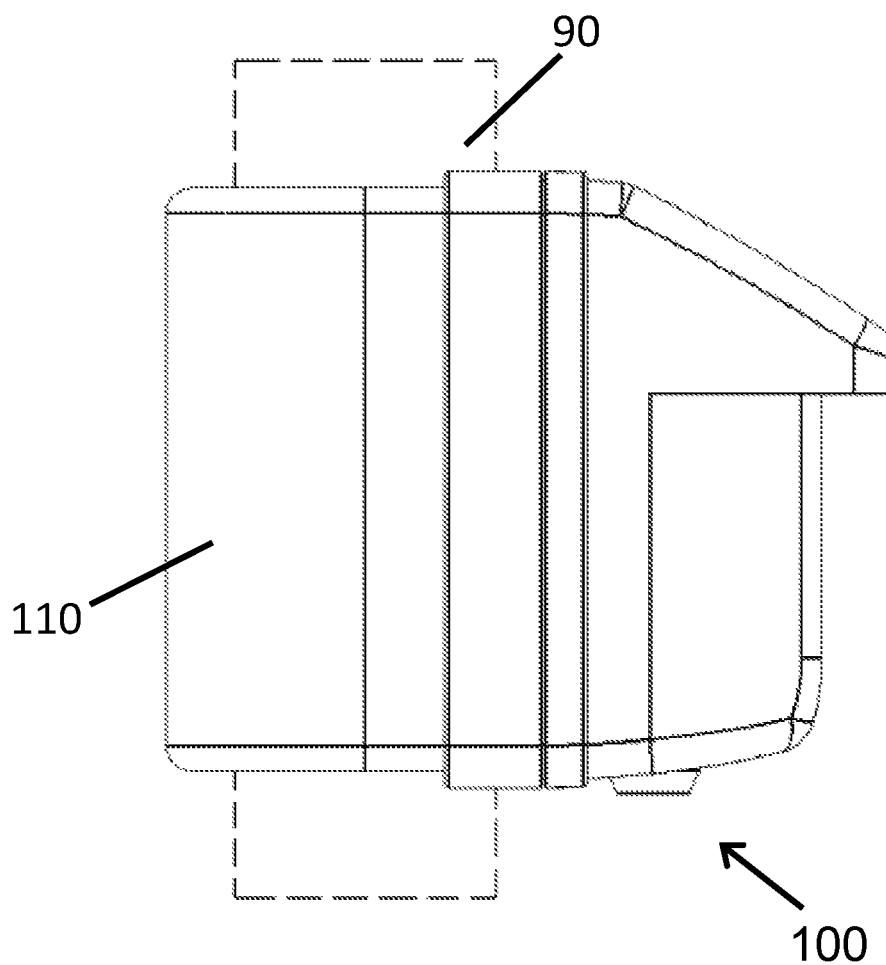
FIG. 4 shows a non-limiting example of a device described herein; in this case, a left side view of an exemplary device mounted on a pole.

Turning now to FIG. 4, in another embodiment, a device 100 of the present invention, shown in a left view, comprises a housing 110 which is configured to mount to a pole 90 supporting an existing meter. The interior of the housing 110 optionally houses components comprising environmental sensors, batteries, RFID tag readers, wireless radio transmitters, or a combination thereof. The housing 110 optionally has a solar panel.

Figure 5:
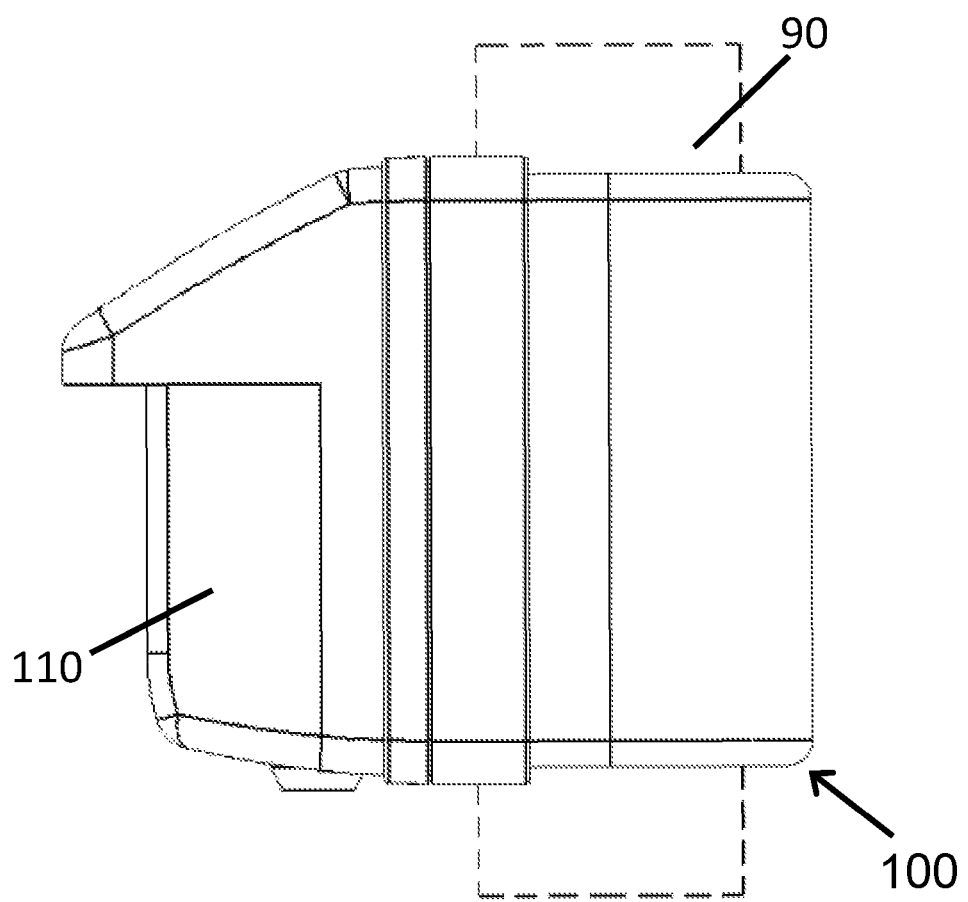
FIG. 5 shows a non-limiting example of a device described herein; in this case, a right side view of an exemplary device mounted on a pole.

Referring now to FIG. 5, in a particular embodiment, a device 100 of the present invention, shown in a right view, comprises a housing 110 which is configured to mount to a pole 90 supporting an existing meter. The interior of the housing 110 optionally houses components comprising environmental sensors, batteries, RFID tag readers, wireless radio transmitters, or a combination thereof. The housing 110 optionally has a solar panel.

Figure 6:
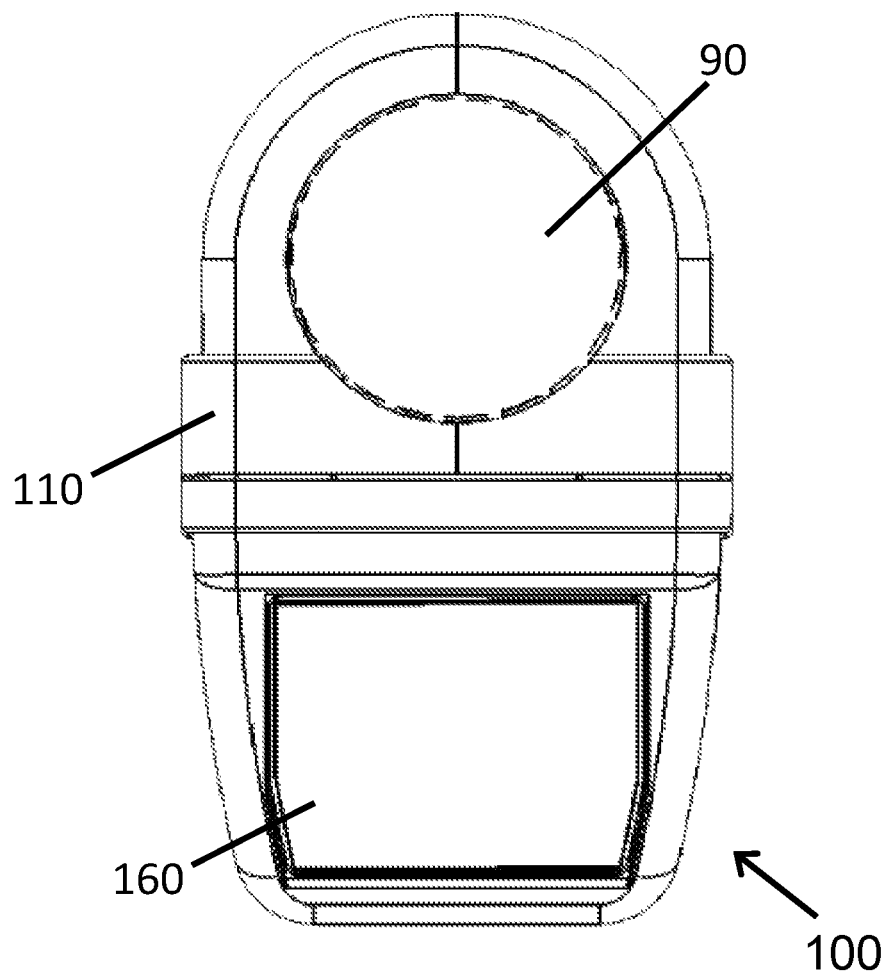
FIG. 6 shows a non-limiting example of a device described herein; in this case, a top view of an exemplary device mounted on a pole.

Turning now to FIG. 6, in another embodiment, a device 100 of the present invention, shown in a top view, comprises a housing 110 which is configured to mount to a pole 90 supporting an existing meter. The interior of the housing 110 optionally houses components comprising environmental sensors, batteries, RFID tag readers, wireless radio transmitters, or a combination thereof. The housing 110 optionally has a solar panel. The housing 110 further comprises a screen 160. In one embodiment, the screen 160 is a display screen. In another embodiment, the screen 160 is a solar panel. In still another embodiment, the screen 160 is a touchscreen to allow input of information by the user.

Figure 7:
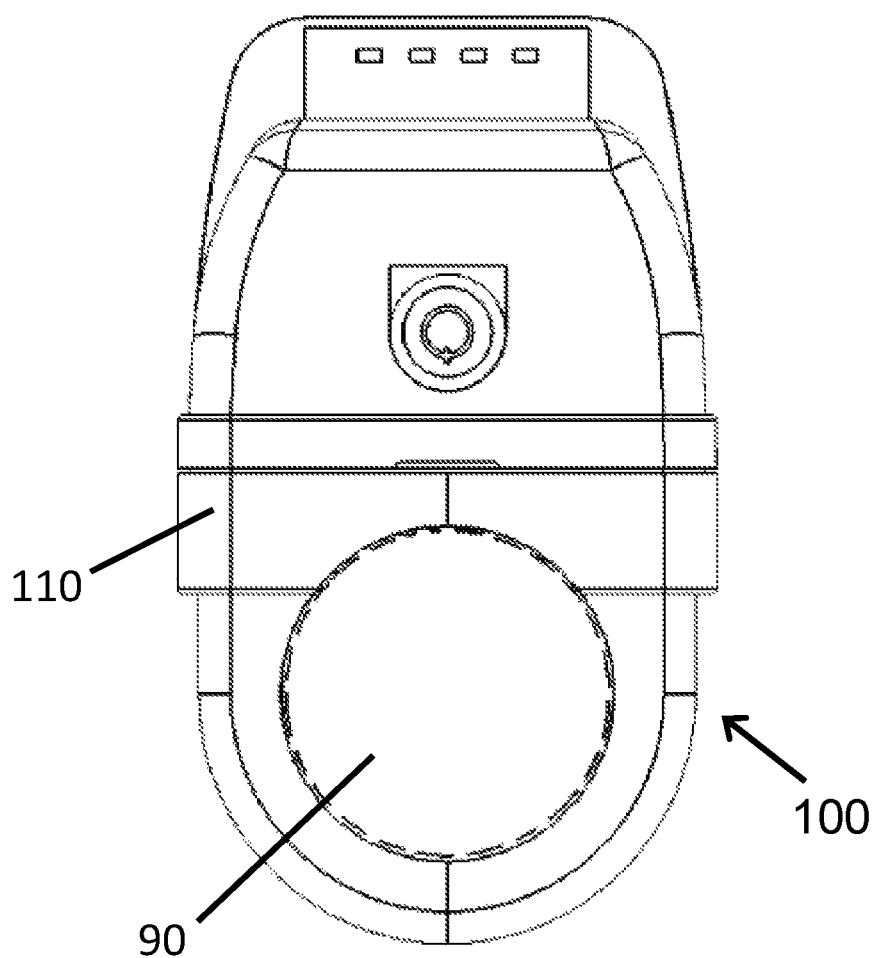
FIG. 7 shows a non-limiting example of a device described herein; in this case, a bottom view of an exemplary device mounted on a pole.

Referring now to FIG. 7, in a particular embodiment, a device 100 of the present invention, shown in a bottom view, comprises a housing 110 which is configured to mount to a pole 90 supporting an existing meter. The interior of the housing 110 optionally houses components comprising environmental sensors, batteries, RFID tag readers, wireless radio transmitters, or a combination thereof. The housing 110 optionally has a solar panel. The housing 110 further comprises a screen 160. In one embodiment, the screen 160 is a display screen. In another embodiment, the screen 160 is a solar panel. In still another embodiment, the screen 160 is a touchscreen to allow input of information by the user. In addition, the housing 110 optionally has a plurality of button for the user to input information or select choices display on screen 160.

Figure 8:
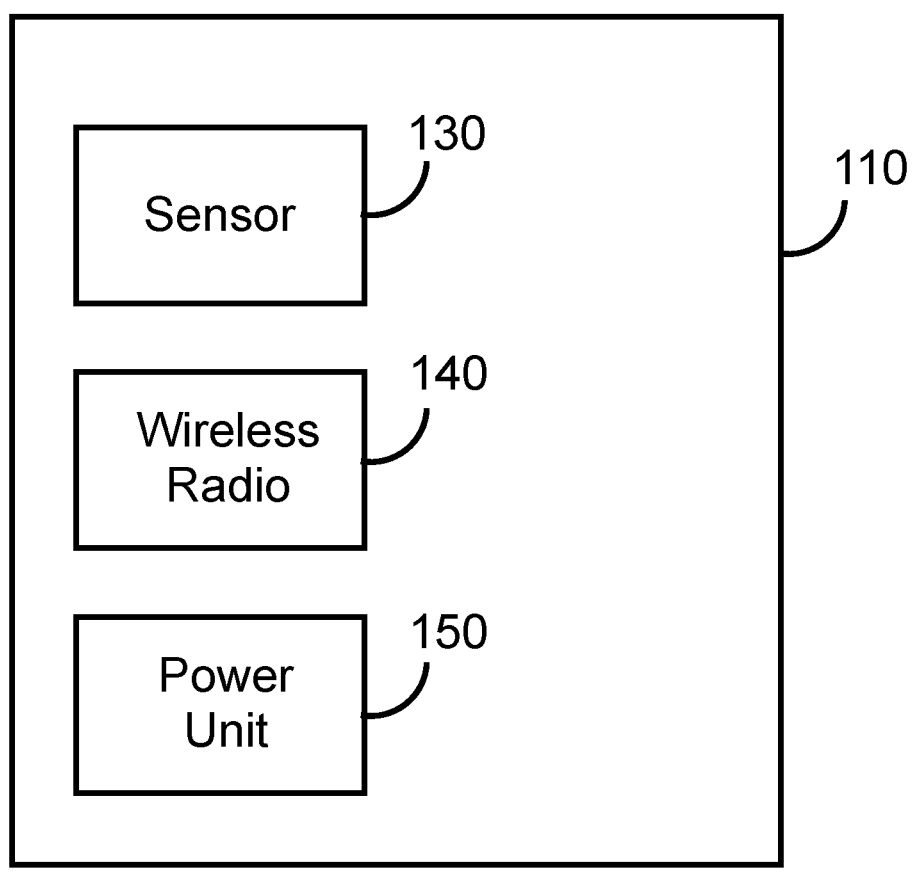
FIG. 8 shows a functional block diagram of the device of FIG. 1.

Referring to FIG. 8, in a particular embodiment, the functional block diagram of a device 100 that can be used in FIGS. 1-7 is shown. The device 100 includes a housing 110 which encloses a sensor 130, a wireless radio 140 and a power unit 150. The power unit 150 powers both the sensor 130 and the wireless radio 140. The housing 110 is configured to engage and lock into a variety of different meter poles.

Figure 9:
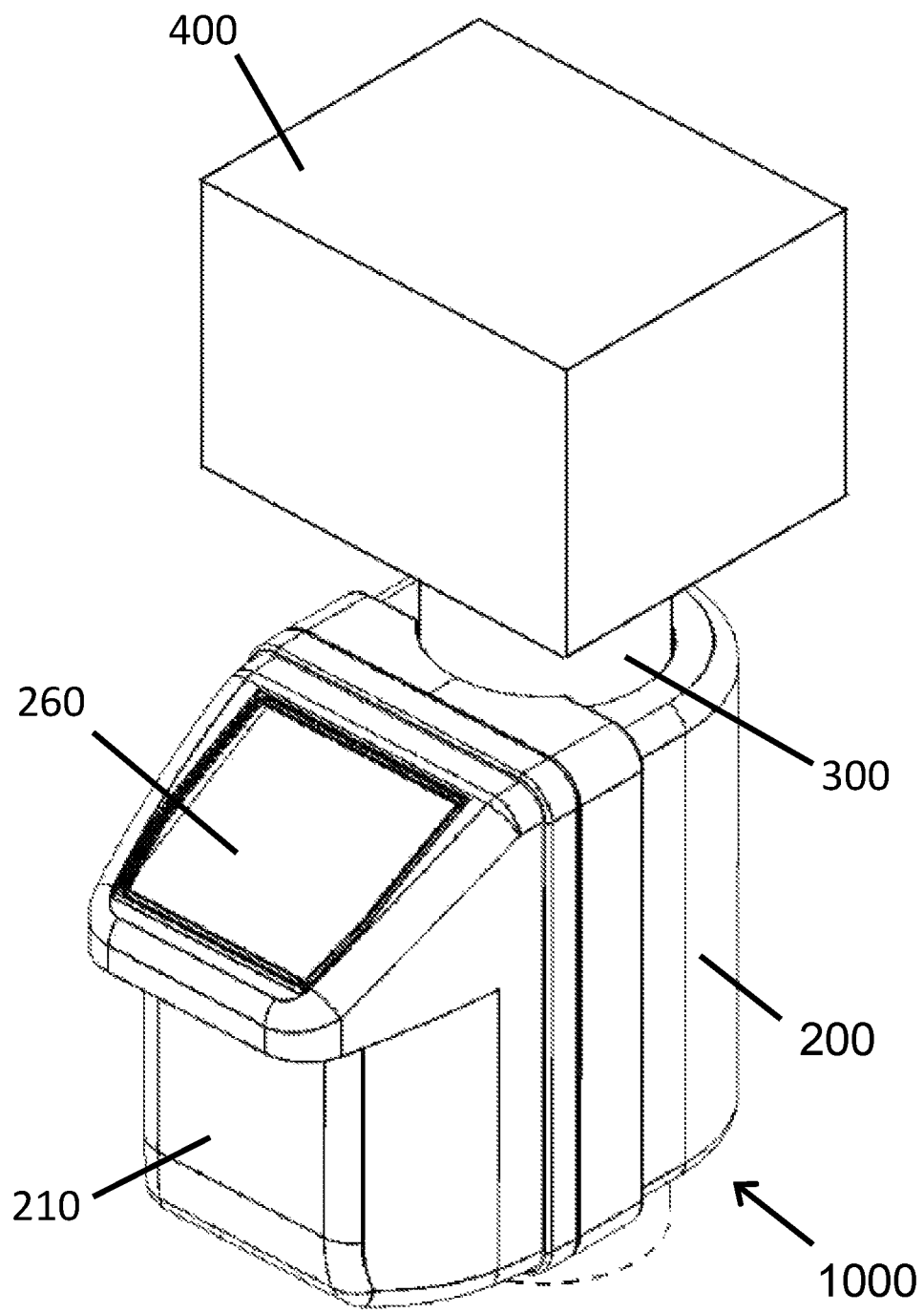
FIG. 9 shows a non-limiting example of a meter described herein; in this case, a top front perspective view of an exemplary meter that comprises a meter device, a device and a pole.
Figure 10:
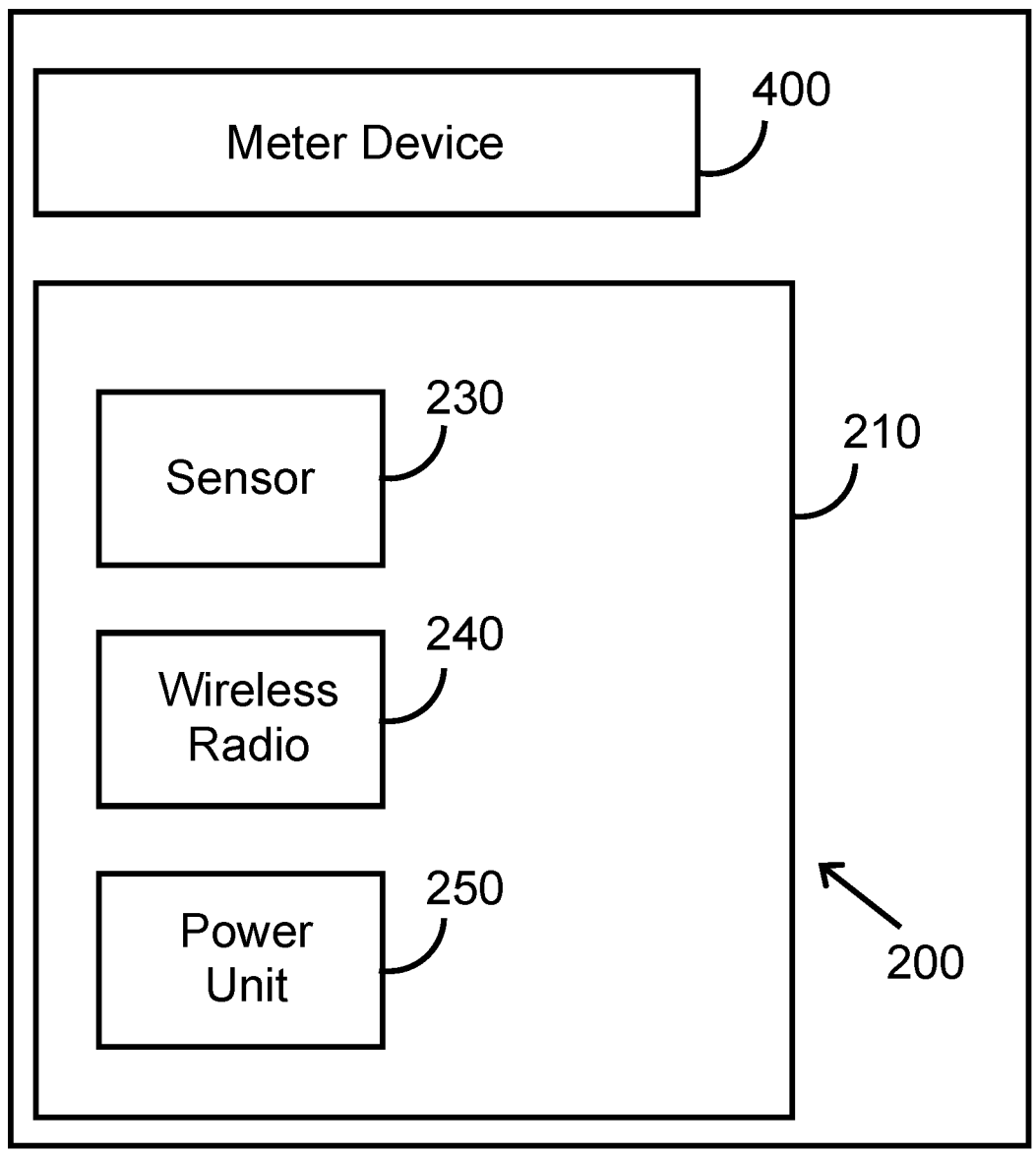
FIG. 10 shows a functional block diagram of the meter of FIG. 9.

Tuning now to FIGS. 9-10, in a particular embodiment, a meter 1000 of the present invention comprises a meter device 400 supported by a pole 300, and a device 200 mounted to the pole 300. The device 200 comprises a housing 210 which is configured to mount to a pole 300 supporting the meter device 400. The interior of the housing 210 optionally houses components comprising environmental sensors, batteries, RFID tag readers, wireless radio transmitters, or a combination thereof. In some embodiments, the housing 210 comprises one or more radio-transparent and/or radar transparent surfaces. In some embodiments, the housing 210 comprises a solar panel 260. In some embodiments, the housing 210 comprises one solar panel. In other embodiments, the housing 210 comprises a plurality of solar panels, such as 2, 3, 4, 5, 6, 7, 8 or more solar panels. In some embodiments, the housing 210 comprises a display screen to communicate messages to, for example, parking enforcement officers, maintenance workers, and/or consumers. In some embodiments, the device 200 is not wired to the meter device 400. In further embodiments, the device 200 communicates wirelessly with the meter device 400 via an RFID tag reader or a wireless radio transmitter enclosed in the housing 210. Such an arrangement allows upgrade of an existing meter without alteration, or even accessing, the meter itself. In other embodiments, the device 200 is wired to the meter device 400.

Referring to FIG. 10, in a particular embodiment, the functional block diagram of a meter 1000 that can be used in FIG. 9 is shown. The meter 1000 comprises a meter device 400 and a device 200. The device 200 includes a housing 210 which encloses a sensor 230, a wireless radio 240 and a power unit 250. In one embodiment, the device 200 is wired to the meter device 400 and communicates with the meter device 400 using the wired connections. In another embodiment, the device 200 is not wired to the meter device 400 and the device 200 communicates wirelessly with the meter device 400 via the wireless radio 240 or an RFID tag reader enclosed in the housing 210. The power unit 250 powers both the sensor 230 and the wireless radio 240. Both the meter device 400 and the housing 210 are configured to engage a pole 300. In some embodiments, the device is configured to reversibly engage the pole at about the level of a vehicle in the associated parking space.

Sensors

In certain embodiments, the housing of the device encloses one or more sensors. In some embodiments, the sensor is an environmental sensor. In various embodiments, the housing of the device suitably encloses 1, 2, 3, 4, 5, 6, 7, 8, 9, 10 or more environmental sensors. In some embodiments, a suitable environmental sensor is any sensor that is capable of emitting a signal and detecting the signal when it is reflected back from the surface of a vehicle that moves into a single parking space or multiple parking spaces situated to the left and right of the parking meter. Examples of suitable environmental sensors include, by way of non-limiting examples, radar, low power/broad spectrum radar, time of flight sensors, ranging sensors, magnetic sensors, magnetic-flux sensors, non-intrusive sensors, capacitance sensors, proximity sensors, ultrasonic sensors, infrared sensors, microwave sensors, and the like. In other embodiments, the environmental sensor is a mass sensor, e.g., a magnetometer. In some embodiments, the environmental sensor detects the presence of a Bluetooth device, including a cell phone and smart phone. In a particular embodiment, the sensor is a vehicle sensor.

In some embodiments, a suitable environmental sensor is any sensor that is capable of making a qualitative assessment or a quantitative measurement of a physical or chemical aspect of the area immediately surrounding the meter. Examples of suitable environmental sensors include, by way of non-limiting examples, those that detect or measure atmospheric pressure, humidity, wind speed, wind direction, precipitation, flooding, seismic activity, light, UV index, and/or temperature. In other embodiments, the environmental sensor detects sound, chemicals, including gaseous chemicals or liquid chemicals or solid chemicals, or images. In some embodiments, the environmental sensor transmits information, such as detected chemicals, via a wireless radio of the device. In some embodiments, the environmental sensor is wirelessly connected to a network in order to communicate detection data to one or more remote servers or to a cloud computing system or service, to receive instructions or commands, and to send out instructions or commands. In other embodiments, the environmental sensor is self-powered by a battery. In some embodiments, the environmental sensor is wirelessly charged. In other embodiments, the environmental sensor is wired to and powered by a power source. In some embodiments, the environmental sensor has a wired connection to an external power source, such as a powered DC or a powered meter mounted above, below or besides the environmental sensor. In some embodiments, the environmental sensor reads an RFID tag. In other embodiments, then the environmental sensor reads an RFID tag, the environmental sensor determines configuration information associated with the sensor and recalibrates itself accordingly. In some embodiments, the configuration information associated with the environmental sensor includes operation parameters affecting the operation of the environmental sensor, maintenance record of the environmental sensor, and record of data reporting, etc.

Further examples of suitable environmental sensors include, by way of non-limiting examples, those that detect or measure air particulates, air pollution, and/or water pollution. In various embodiments, suitable air pollution sensors include those that detect or measure pathogens, sulfur oxides ($SO_x$), nitrogen oxides ($NO_x$), greenhouse gases, carbon monoxide (CO), carbon dioxide ($CO_2$), methane, volatile organic compounds (VOCs), toxic metals (such as lead and mercury), chlorofluorocarbons (CFCs), ammonia ($NH_3$), ground level ozone ($O_3$), and/or peroxyacetyl nitrate (PAN). In various embodiments, suitable water pollution sensors include those that detect or measure detergents, insecticides, pathogens, hydrocarbons, VOCs, chlorinated solvents, perchlorate, fertilizers, and heavy metals.

Further examples of suitable environmental sensors include, by way of non-limiting examples, those that detect or measure chemical agents, biological agents, natural gas, radiation, and/or electromagnetic energy. In a particular embodiment, at least one sensor is a camera. In further particular embodiments, a camera images one or more parking spaces associated with the meter. Further examples of suitable environmental sensors include, by way of non-limiting examples, those that detect or measure sound.

In some embodiments, sensors in device housings are installed on a plurality of meters throughout a municipality. In further embodiments, the sensor-enabled meters have communication capability and form a sensor network by transmitting environmental information from a range of territory within the municipality to a central management server. By forming a sensor network, the upgraded meters allow officials of the municipality to monitor the environment on an ongoing basis or in an emergency. By way of example, a sensor network is optionally used to monitor point sources of air pollution within the municipality on a continual basis. By way of further example, a sensor network is optionally used to monitor spread of radiation within the municipality during an act of war or terrorism. By way of further example, a sensor network is optionally used to determine the location of gunshots fired within a municipality. By way of further example, a sensor network is optionally used to monitor flooding within the municipality in an extreme weather event.

In certain embodiments, an environmental sensor is housed within either the left side or the right of, either the top portion or the lower portion of, either the front or the back of the housing of the device when the device is facing the user or the parking space associated with the parking meter. In certain embodiments, the sensor is mounted on a pivoted support that allows the rotation of an object about a single axis, e.g., a gimbal. This feature facilitates the positioning of the sensor in multiple angles, depending on the relative position of the parking meter and the one or more parking spaces that the meter is intended to monitor. In some embodiments, the sensor is adjustable horizontally (angle) and/or vertically (tilt). In some embodiments, when more than one sensor is enclosed within the housing of the device, the sensors can move in sync with each other, in the same direction or orientation. In other embodiments, when more than one sensor is enclosed within the housing of the device, a sensor can move independently with regard to another sensor.

Wireless Radio

In some embodiments, the housing of the device does not include a wireless radio transmitter/receiver, but rather communicates (via wired or wireless connection) with the meter device, which does include a wireless radio transmitter/receiver. In such embodiments, the housing of the device utilizes the wireless radio of the meter device for longer-range communication. In some embodiments, the wireless radio communicates with a meter above, below, or beside the device comprising the wireless radio. In other embodiments, the wireless radio is wired to and connected with a meter above, below, or besides the device comprising the wireless radio. In some embodiments, the wireless radio detects signals from other wireless device nearby, such as, for example, a Bluetooth device held by an officer, and communicates with the detected wireless device when authorized. In some embodiments, when a dangerous level of a chemical is detected by the environmental senor of the device, the wireless radio can search for and detect a wireless device, such as, for example, a Bluetooth device held by a parking enforcement officer or a police officer on patrol, and send energy information to the Bluetooth device to alert the authority. In other embodiments, a wireless device, such as, for example, a Bluetooth device held by a parking enforcement officer or a police officer on patrol, can send emergency information, such as a fire alert, to the wireless radio of the device. After receiving such emergency information, the device can display received information on a display screen of the device to alert user of the device of the emergency.

In some embodiments, the housing of the device encloses a wireless radio transmitter/receiver. The wireless radio can be any equipment known in the art that is capable of receiving and/or transmitting radio waves, using any methods. For example, the wireless radio transmitter and receiver can be any equipment that can transmit and receive radio waves in any known fashion using any known data protocol, many of which are well known in the art, without departing from the scope of this invention.

The wireless radio transmitter suitably utilizes ISM band, Wi-Fi, Bluetooth, ZigBee, iBeacon, cellular (e.g., GSM, GPRS, EDGE, 2G, 2.5G, 3G, 4G, 5G, etc.), IEEE 802.15, WiMAX, or the like, to transmit information. The wireless radio transmitter is optionally used to communicate information collected from, for example, one or more sensors, the meter mechanism, or one or more RFID tags, to a remote server. The wireless radio transmitter is also optionally used to communicate internal information such as maintenance and error reporting messages, to one or more remote servers or a cloud computing system. The wireless radio transmitter is optionally used to communicate information to the meter mechanism, to one or more RFID tags (including memory) associated with the meter, to one or more remote servers, to a cloud computing system, to one or more parking enforcement officers, and/or to a meter maintenance technician.

In some embodiments, the wireless radio communicates to the meter or a remote server by relaying information through another object. For example, the object is, by way of non-limiting examples, another meter device, a vehicle, a consumer device, a mobile phone, a smartwatch, a camera, a computer, a laptop, an electronic notepad, or a PDA. In various embodiments, the wireless radio communicates directly to a database, a user, an enforcement officer, or a maintenance technician.

RF Tag-Based Configuration and Binding

In some embodiments, an RFID reader is within the interior of the housing of the device. In some embodiments, the electronic components within the housing of the device obtain configuration information by reading an RFID tag associated with an existing meter or a meter device to obtain a unique ID, which is associated with a unique physical location in a remote database.

In some embodiments, the device, while comprising an RFID reader, will read an RFID tag associated with the meter or meter device to obtain a unique ID and use the ID to determine if the meter location is configured in the database to have a sensor. In further embodiments, if the meter location is configured in the database to have a sensor, the housing of the device downloads configuration information from a remote management system. This enables the housing of the device and sensor within to be changed and update automatically to communicate wirelessly with the exiting meter or the meter device in place.

In other embodiments, the housing of the device does not include an RFID reader, but rather the electronic components within the housing of the device communicate via wired or wireless connection to the meter device which does include an RFID reader. In such embodiments, the RFID reader of the meter device reads an RFID tag associated with the meter to obtain a unique ID, which is associated with a unique physical location in a remote database, and passes that information on to the housing of the device.

In further embodiments, the meter device, including an RFID reader, will read an RFID tag associated with the meter to obtain a unique ID and use the ID to determine if the meter location is configured in the database to have a sensor. In further embodiments, if the meter location is configured in the database to have a sensor, the meter device downloads from a remote management system a binding code enabling the meter to wirelessly connect to, and wirelessly communicate with that sensor. This enables the meter mechanism to be changed and update automatically to communicate wirelessly with the sensor in place.

In some embodiments, sensor configurable parameters, testing, and feedback information are optionally displayed on the meter display or on a wireless handheld device of a user (smart phone, smart watch, etc.). The parameters, testing, and feedback information is useful used during initial setup and diagnostics. In fact, when the sensor detects a vehicle, in some embodiments, the sensor triggers an icon or other visual indicator to appear on the meter display in order to confirm that it is detecting properly.

Power Unit

In some embodiments, one or more power units are within the interior of the housing. The power unit can be any device that is capable of supplying power for operating the electronic components within the housing of the device. Suitable power units include rechargeable or non-rechargeable batteries, capacitors, ultracapacitors, and the like, including combinations thereof. In various embodiments, suitable batteries include primary batteries, secondary batteries, wet cell batteries, dry cell batteries, reserve batteries, including combinations thereof. In further various embodiments, suitable batteries include, lithium, Li-ion rechargeable, alkaline, carbon-zinc, Li—$FeS_2$, NiMH, NiCd, NiOOH, including combinations thereof.

In some embodiments, the one or more sensors are powered solely by batteries.

In various embodiments, one or more power units are configured to enter power saving mode, wherein the one or more power units discharge less power and the meter disables some electronic components after a preset idle time.

In other embodiments, the housing of the device includes one or more solar panels configured to charge one or more rechargeable batteries.

Methods for Meter Upgrades Using Device

Described herein, in certain embodiments, are methods of upgrading a meter comprising: affixing a device to a pole supporting an existing meter; provided that the device comprises: a housing defining an interior; a sensor within the interior of the housing, the sensor configured to collect environmental information pertaining to the local external environment of the exiting meter; a wireless radio within the interior of the housing, the wireless radio configured to transmit the environmental information to the exiting meter or to a remote server in communication with the exiting meter; an RF reader within the interior of the housing, the RF reader configured to receive a meter identification from a wireless tag associated with the existing meter, the wireless radio further configured to transmit the meter identification in association with the environmental information; and a power unit within the interior of the housing, the power unit supplying power to the sensor, the wireless radio, and the RF reader; whereby the meter is upgraded (e.g., retrofit to confer vehicle detection capability). In some embodiments, the existing meter is not altered or replaced. In other embodiments, the existing meter is a parking meter, the sensor is a vehicle sensor, and the environmental information comprises the presence of a vehicle in a parking space associated with the existing meter. In further embodiments, the sensor is a radar.

The meter upgrade methods described herein generate minimal waste, reduce material and labor costs, and can be complete more quickly than current methods. Importantly, the meter upgrade methods described herein allow convenient operation by simply attach a device of the present invention to the pole of an existing parking meter. The exact location of the attachment varies according to factors such as the original setup of the existing meter and the orientation of the pole to the associated parking space. While upgrading an existing meter, the device of the present invention can be placed above, below or on the side of an existing meter depending on the location and conditions of the pole, and the configurations of the existing meter.

Applications Enabled by Upgraded Device Housings

The meters upgraded with the device described in the present invention are optionally used for multiple applications, as described herein. In certain embodiments, the housings of the device described herein comprise a payment accepting unit which is positioned within the housing. In further embodiments, a meter retrofitted with the device can accept payment, in various forms, e.g., Credit Cards, Debit Cards, Smart Parking Cards, Proximity Cards (Paywave™, PaypassCash™) NFC Solutions such as Google Wallet™, bills, or coins, via the payment accepting unit of the housing. In particular embodiments, the devices described herein comprise a wireless payment accepting unit which is positioned on one side of the housing. In further embodiments, the wireless payment accepting unit enables a meter retrofitted with the housing of the device to accept payment via Proximity Cards (Paywave™, PaypassCash™) or NFC Solutions such as Google Wallet™. In still further embodiments, a sensor affixed to the housing of the device detects the arrival of a user towards the device or the arrival of a vehicle in a parking space associated with the meter and communicates the event to the meter device or the existing parking meter. In some embodiments, this event information is used to power-up the payment accepting unit (which had been powered-down to conserve energy), activate the payment accepting unit, or allow the payment accepting unit to anticipate or prepare for acceptance of payment.

In certain embodiments, the power unit affixed to the housing of the device can be in an off-mode in the absence of any vehicle presence in the parking space(s) associated with the meter. The power unit is optionally turned on, only upon detection, by the sensor affixed to the device, of vehicle presence in the parking space(s) associated with the meter. This results in reduction of energy costs associated with operating the meter. In certain embodiments, the meters rapidly switch on upon detection of vehicle presence by the sensors, and are ready for carrying out payment transactions even before the vehicle driver walks up to the meter.

In some embodiments, the sensor affixed to the housing of the device of the parking meter, communicates the information regarding the departure of the vehicle to the meter device or the existing meter and this results in immediate resetting of paid time. In further embodiments, the sensor affixed to the housing of the device of the parking meter, communicates through wireless radio, which in turn transmits the information to the wireless tag affixed to the parking meter, and this results in the update of the display screen of the parking meter and/or the device. Thus, the parking meters describe herein is optionally used to avoid overlap of paid time between successive vehicles occupying the same parking space. This enables collection of increased and accurate revenue from the parking meters of the present invention.

In certain embodiments, the vehicle presence information, within the parking space(s) associated with the parking meter, can be collected by the sensor and transmitted, via the wireless radio transmitter (along with location identification information stored in an RF tag associated with the parking meter), to one or more remote servers, a cluster of servers, or cloud computing system. The types of information transmitted to the server can include, for example, average length of time during which the parking space(s) is/are occupied and paid for, average length of time during which the parking space(s) is/are unoccupied and not paid for, days of the week with maximum occupancy and/or vehicle presence in the parking space(s), or times of the day with maximum occupancy and/or vehicle presence in the parking space(s). The information stored at the server is optionally utilized to model the vehicle flux trends within the local environment of the parking meter, and fix parking rates and/or time limits for parking to precisely meet the needs of the local environment.

EXAMPLES

The following illustrative examples are representative of embodiments of the software applications, systems, and methods described herein and are not meant to be limiting in any way.

Example 1—Installing the Device

A city maintenance technician performs his duties, which include driving around town and upgrading parking meters. He loads his vehicle with devices and a toolbox. When he approaches an outdated meter, he does not need to perform any major upgrades to infrastructure, such as drilling, underground wiring, road work, and the like. As such, he does not need any advanced or heavy tools, such as an industrial hammer drill. Instead, the technician uses his simple tools, for instance a screwdriver and a wrench, to attach the device to the pole of an existing parking meter. The entire process for replacing the housing of the device may require less than 10 minutes for completion. The technician then moves to the next parking meter.

Example 2—Installing Only a Portion of the Device

Technician from Example 1 is performing the same duties, except this time he is only replacing a portion of the device already installed onto the pole. The portion of the device contains upgraded parts beyond those provided in the housing of the device detailed in Example 1, including upgraded sensors, an RFID tag reader, a self-contained power supply, and a dedicated wireless radio. The self-sufficient portion of the device is installed onto the pole. The technician, using the same simple tools, such as a screwdriver and a wrench, disengages and removes a portion of the device and then replaces and engages the upgraded portion of the device, thereby completing an upgrade of the device. The technician does not need to remove the entire device to complete the upgrade, and thereby he does not need to tamper with the parts within the device that are not designed to be upgraded frequently. The process for upgrading the device similarly takes less than 10 minutes.

Example 3—RFID Start-Up Procedures

After technician upgrades a meter with the device or an upgraded portion for an already installed device, technician restarts the meter. The electronic components or the upgraded electronic components in the housing of the device scan the meter RFID tag and determine if that meter location is configured to have a sensor. If the meter is configured to have a sensor in that location, the device or the upgraded portion of the device will use either the meter's wireless radio or its own dedicated wireless radio to download a binding code from a remote management system. The binding code configures the meter, upgraded components, and sensors. The meter wirelessly connects to the new sensors. The meter display is reset, updated, and refreshed. The new meter is now ready for use.

Example 4—Environmental Pollution Sensor Network Through Parking Meters

Some devices or upgraded portions of devices already installed contain various sensors capable of collecting environmental information. Technician upgrades meters around the city with sensors capable of detecting pollution, for instance carbon monoxide and carbon dioxide. The upgraded parking meters configure themselves as described in Example 3, and the meters begin to collect pollution information. The meters transmit this data to a remote server, which upgrades the database with the pollution information. Because meters throughout the entire city are upgraded with pollution sensors, the remote server database builds a pollution map of the city.

Example 5—Waking a Meter from Power Saving Mode and Priming Payment Methods

After a preset idle time, a parking meter enters a power saving mode. A car pulls into a parking space managed by the parking meter. The sensors of the meter detect the presence of a vehicle and wake the meter from power saving mode to restore full functionality. The meter wirelessly retrieves a binding code and activates an integrated wireless payment receiver. The payment receiver is configured to accept payment through a variety of sources, for instance Apple Pay®, and is primed when the meter detects the presence of a newly-parked vehicle. The display screen is also updated upon retrieval of the binding code, allowing a user to easily pay after parking the vehicle.

Example 6—Meter Communication with City Personnel

A parking enforcement officer patrols the city hoping to hand out parking citations to meet her monthly quota. She carries a personal meter scanning device. As she approaches a parking meter, the meter's sensors detect the scanning device, and wirelessly connect to the remote management system to configure the meter to wirelessly transmit environmental information to the scanning device. The officer receives relevant environmental information in assisting her to issue parking citations, including meter identification, meter location, vehicle identification, license plate information, vehicle registration information, citation history, data indicating issuance of a citation, and data related to the type of citation issued.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A device for upgrading an existing meter by retrofit, the device comprising:
   a) a first sensor configured to detect arrival of an object to a local external environment of the existing meter or departure of an object from the local external environment of the existing meter;
   b) a second sensor configured to collect enforcement information pertaining to the local external environment of the existing meter;
   c) a wireless radio configured to:
      i) obtain an identifier from the existing meter, the identifier associated with a unique physical location;
      ii) transmit the identifier to a remote server or to the existing meter to obtain configuration information; and
      iii) transmit the enforcement information to one or more of: the existing meter, the remote server, and a handheld parking enforcement device; and
   d) a power system supplying power to the first sensor, the second sensor, and the wireless radio, the power system comprising at least one rechargeable battery and a solar cell configured to recharge the at least one rechargeable battery;
   wherein the device is configured to retrofit the existing meter by physically mounting to a pole supporting the existing meter to upgrade the existing meter without mechanically altering or replacing the existing meter.

2. The device of claim 1, wherein the existing meter is a parking meter.

3. The device of claim 2, wherein the parking meter is a single space parking meter.

4. The device of claim 2, wherein the parking meter is a multi-space parking meter.

5. The device of claim 2, wherein the object is a vehicle, and wherein the enforcement information comprises one or more images of one or more parking spaces associated with the existing meter.

6. The device of claim 1, wherein the first sensor comprises: a camera, a radar, a time of flight sensor, a ranging sensor, a magnetic sensor, a magnetic-flux sensor, a capacitance sensor, a proximity sensor, an ultrasonic sensor, an infrared sensor, a microwave sensor, a RF sensor, or a combination thereof.

7. The device of claim 1, wherein the second sensor comprises: a camera, a radar, a time of flight sensor, a ranging sensor, a magnetic sensor, a magnetic-flux sensor, a capacitance sensor, a proximity sensor, an ultrasonic sensor, an infrared sensor, a microwave sensor, a RF sensor, or a combination thereof.

8. The device of claim 1, wherein the wireless radio utilizes ISM-band, Wi-Fi, Bluetooth, or ZigBee.

9. The device of claim 1, wherein the identifier comprises a meter identification associated with the existing meter.

10. The device of claim 9, wherein the wireless radio is further configured to transmit the meter identification in association with the enforcement information.

11. The device of claim 1, wherein the wireless radio is further configured to transmit one or more of: the identifier, the configuration information, a meter identification, a meter location, a vehicle identification, a license plate information, a vehicle registration information, and a citation history to one or more of: the existing meter, the remote server, and the handheld parking enforcement device.

12. The device of claim 1, wherein the detection of the arrival or the departure triggers the power system to power up the second sensor.

13. The device of claim 1, wherein the device is operationally self-sufficient, the first sensor, the second sensor, the wireless radio, and the power system being not electrically connected to the existing meter.

14. The device of claim 1, further comprising a housing defining an interior, the first sensor, the second sensor, and the wireless radio within the interior of the housing.

15. A meter comprising:
 a) a pole;
 b) an existing meter supported by the pole; and
 c) a device for upgrading the existing meter by retrofit, the device configured to physically mount to the pole to upgrade the existing meter without mechanically altering or replacing the existing meter, the device comprising:
  i) a first sensor configured to detect arrival of an object to a local external environment of the existing meter or departure of an object from the local external environment of the existing meter;
  ii) a second sensor configured to collect enforcement information pertaining to the local external environment of the existing meter;
  iii) a wireless radio configured to: obtain an identifier from the existing meter, the identifier associated with a unique physical location; transmit the identifier to a remote server or to the existing meter to obtain configuration information; and transmit the enforcement information to one or more of: the existing meter, the remote server, and a handheld parking enforcement device; and
  iv) a power system supplying power to the first sensor, the second sensor, and the wireless radio, the power system comprising at least one rechargeable battery and a solar cell configured to recharge the at least one rechargeable battery.

16. The meter of claim 15, wherein the existing meter is a parking meter, wherein the object is a vehicle, and wherein the enforcement information comprises one or more images of one or more parking spaces associated with the existing meter.

17. The meter of claim 15, wherein the first sensor or the second sensor comprises: a radar, a time of flight sensor, a ranging sensor, a magnetic sensor, a magnetic-flux sensor, a capacitance sensor, a proximity sensor, an ultrasonic sensor, an infrared sensor, a microwave sensor, a RF sensor, or a combination thereof.

18. The meter of claim 15, wherein the detection of the arrival or the departure triggers the power system to power up the second sensor.

19. The meter of claim 15, wherein the device is operationally self-sufficient, the first sensor, the second sensor, the wireless radio, and the power system being not electrically connected to the existing meter.

20. A method of upgrading a meter comprising: physically affixing a device for upgrading an existing meter by retrofit to a pole supporting the existing meter;
 wherein the device comprises:
  a) a first sensor configured to detect arrival of an object to a local external environment of the existing meter or departure of an object from the local external environment of the existing meter;
  b) a second sensor configured to collect enforcement information pertaining to the local external environment of the existing meter;
  c) a wireless radio configured to:
   i) obtain an identifier from the existing meter, the identifier associated with a unique physical location;
   ii) transmit the identifier to a remote server or to the existing meter to obtain configuration information; and
   iii) transmit the enforcement information to one or more of: the existing meter, the remote server, and a handheld parking enforcement device; and
  d) a power system supplying power to the first sensor, the second sensor, and the wireless radio, the power system comprising at least one rechargeable battery and a solar cell configured to recharge the at least one rechargeable battery;
 wherein the existing meter is not mechanically altered or replaced;
 whereby the meter is upgraded to collect and transmit the enforcement information.

* * * * *